(12) United States Patent
Furuta

(10) Patent No.: US 6,441,967 B2
(45) Date of Patent: Aug. 27, 2002

(54) ZOOM LENS SYSTEM

(75) Inventor: Akiko Furuta, Matudo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/800,525

(22) Filed: Mar. 8, 2001

(30) Foreign Application Priority Data

Mar. 14, 2000 (JP) .......................................... 2000-070781
Feb. 28, 2001 (JP) .......................................... 2001-055060

(51) Int. Cl.[7] .............................................. G02B 15/14
(52) U.S. Cl. ........................ 359/684; 359/680; 359/682; 359/691
(58) Field of Search ................................ 359/680, 682, 359/684, 689, 691

(56) References Cited

U.S. PATENT DOCUMENTS

| 4,726,667 A | * | 2/1988 | Tachihara | 359/681 |
| 5,715,097 A | | 2/1998 | Shibayama et al. | 359/691 |
| 5,737,129 A | * | 4/1998 | Ohtake et al. | 359/691 |
| 5,801,887 A | * | 9/1998 | Sato | 359/691 |
| 2001/0030812 A1 | * | 10/2001 | Furta | 359/680 |

FOREIGN PATENT DOCUMENTS

| JP | 60-34734 | 8/1985 |
| JP | 4-15612 | 1/1992 |
| JP | 8-327907 | 12/1996 |

* cited by examiner

Primary Examiner—Georgia Epps
Assistant Examiner—David N. Spector
(74) Attorney, Agent, or Firm—Miles & Stockbridge P.C.

(57) ABSTRACT

An inner-focusing type super wide-angle zoom lens system consisting of two lens groups, a negative lens group and a positive lens group, with the maximum angle of view of more than 100° and the zoom ratio of 1.7 or more is provided. The zoom lens system includes, in order from the object side, a first lens group G1 having a negative refractive power and a second lens group G2 having a positive refractive power. Zooming operation is carried out by changing the interval between the first lens group G1 and the second lens group G2. The second lens group consists of, in order from the object side, a front second lens group G2a having a positive refractive power and a rear second lens group G2b having a positive refractive power. Focusing operation from infinity to near object is carried out by moving the front second lens group G2a to the image side. Predetermined conditional expressions are satisfied.

18 Claims, 12 Drawing Sheets

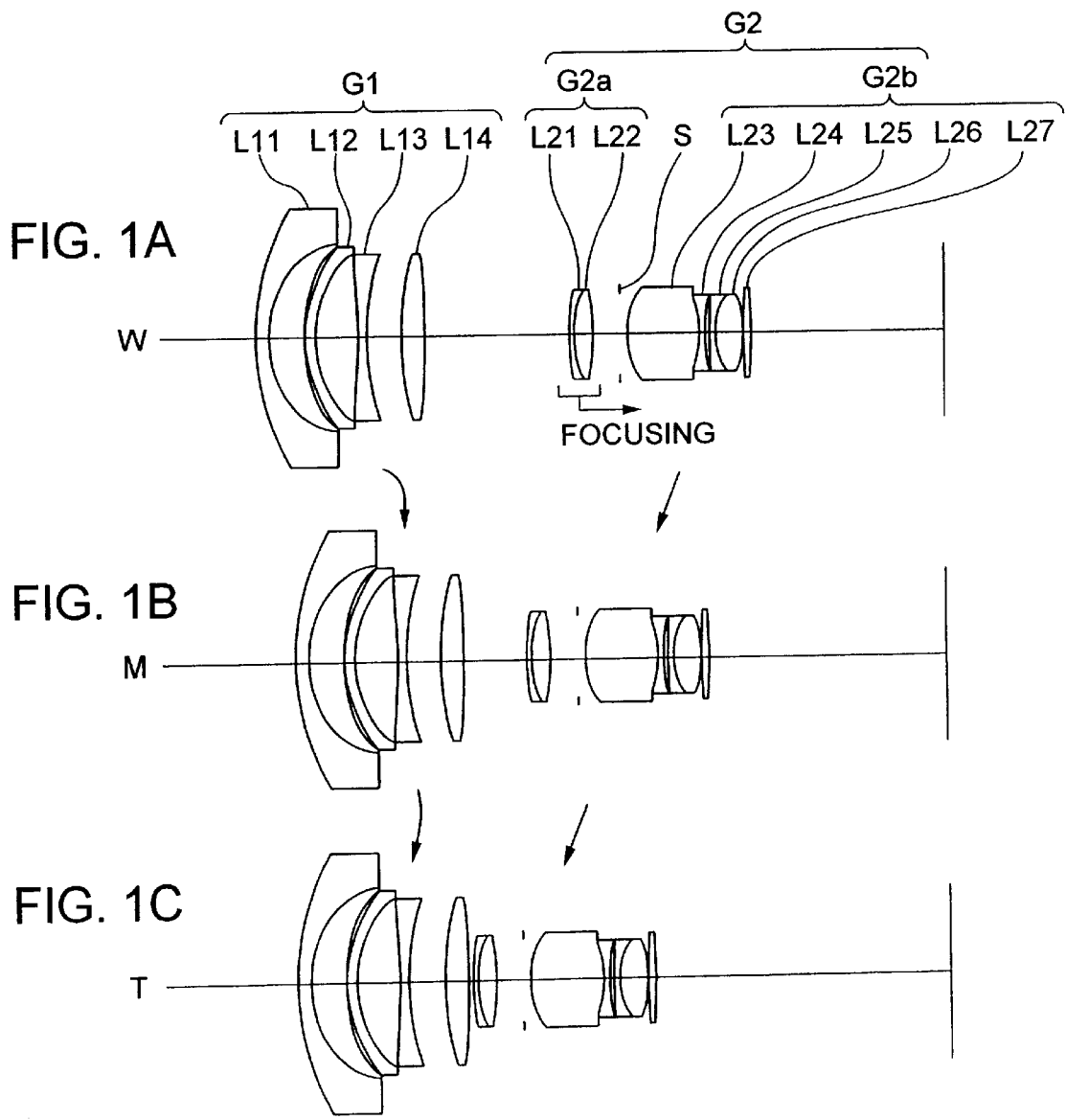

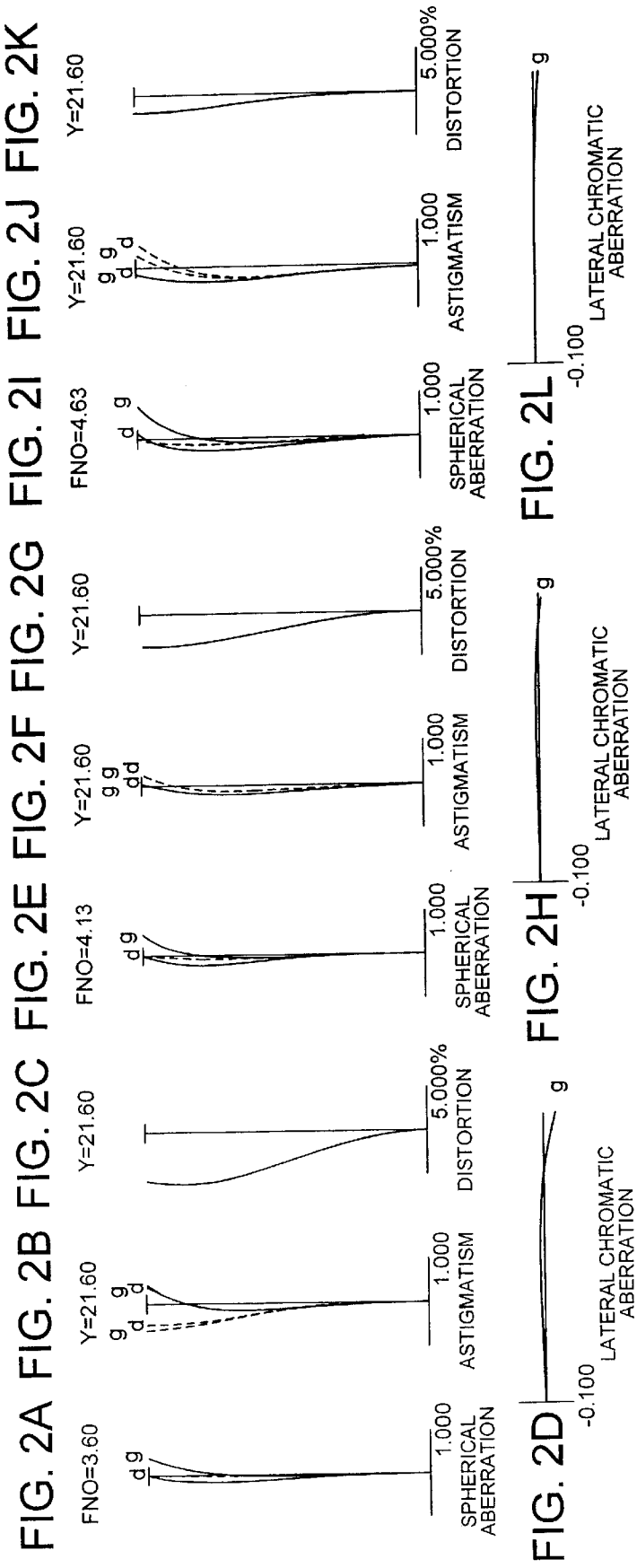

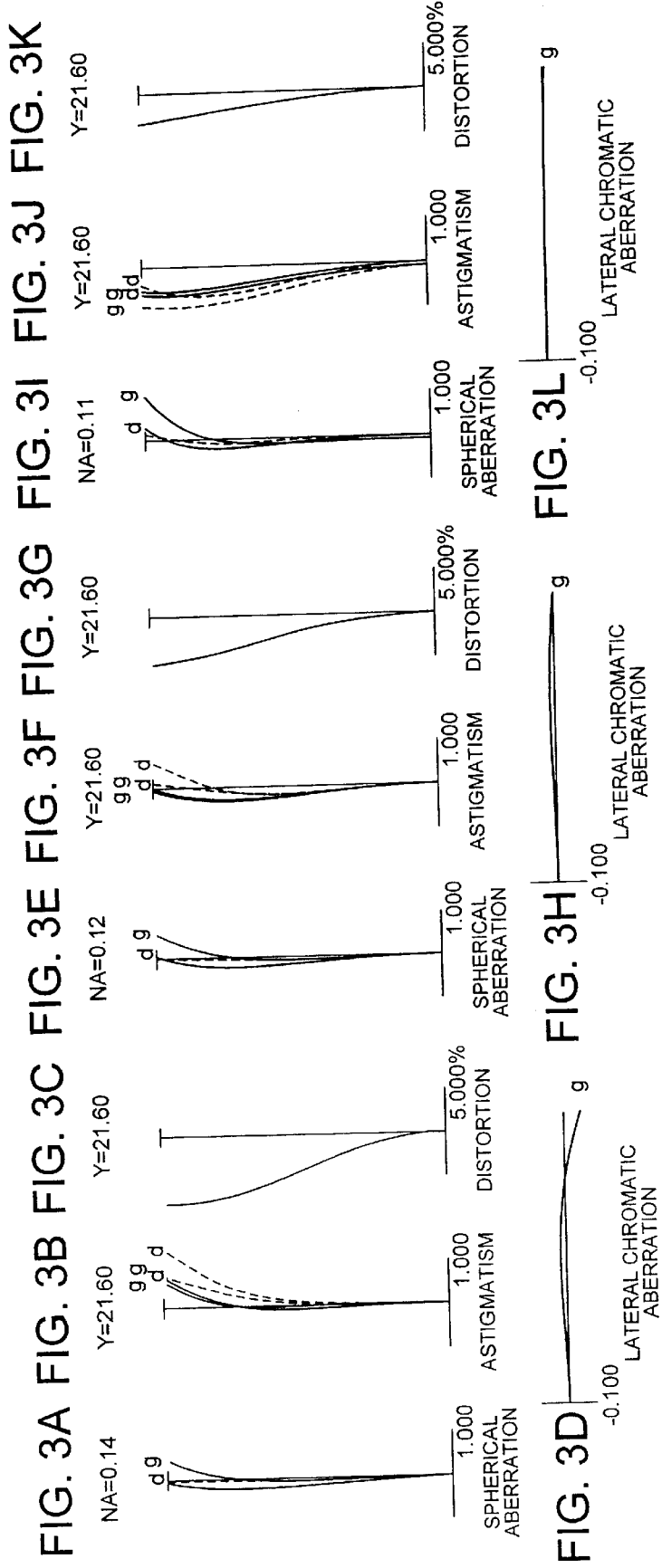

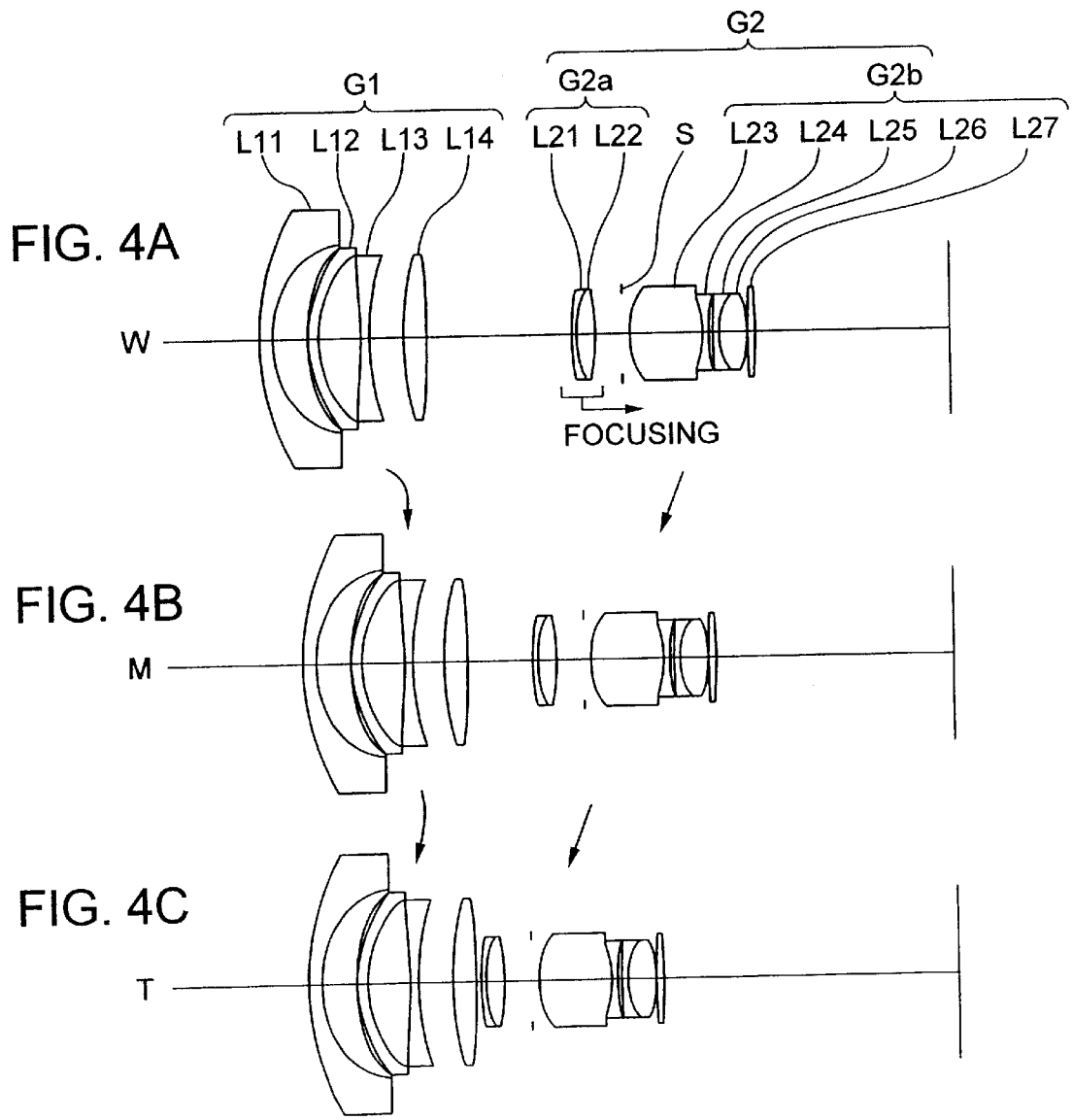

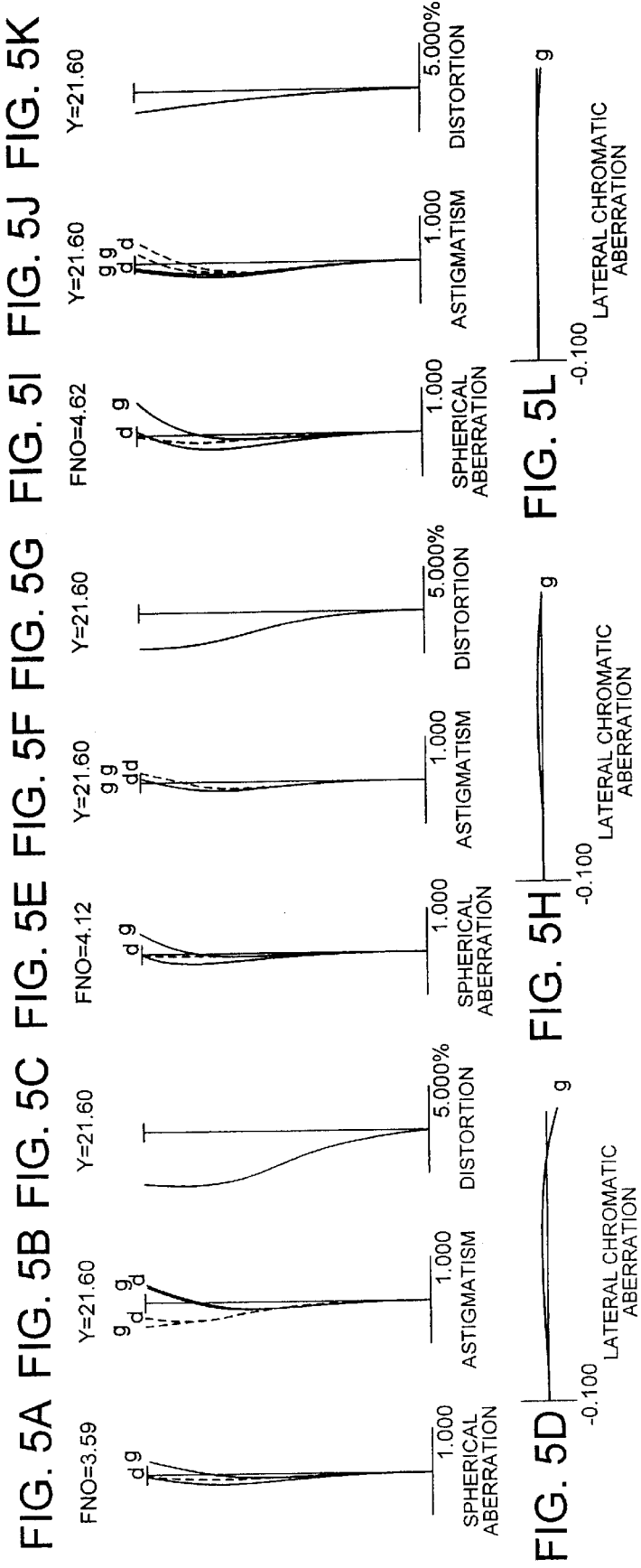

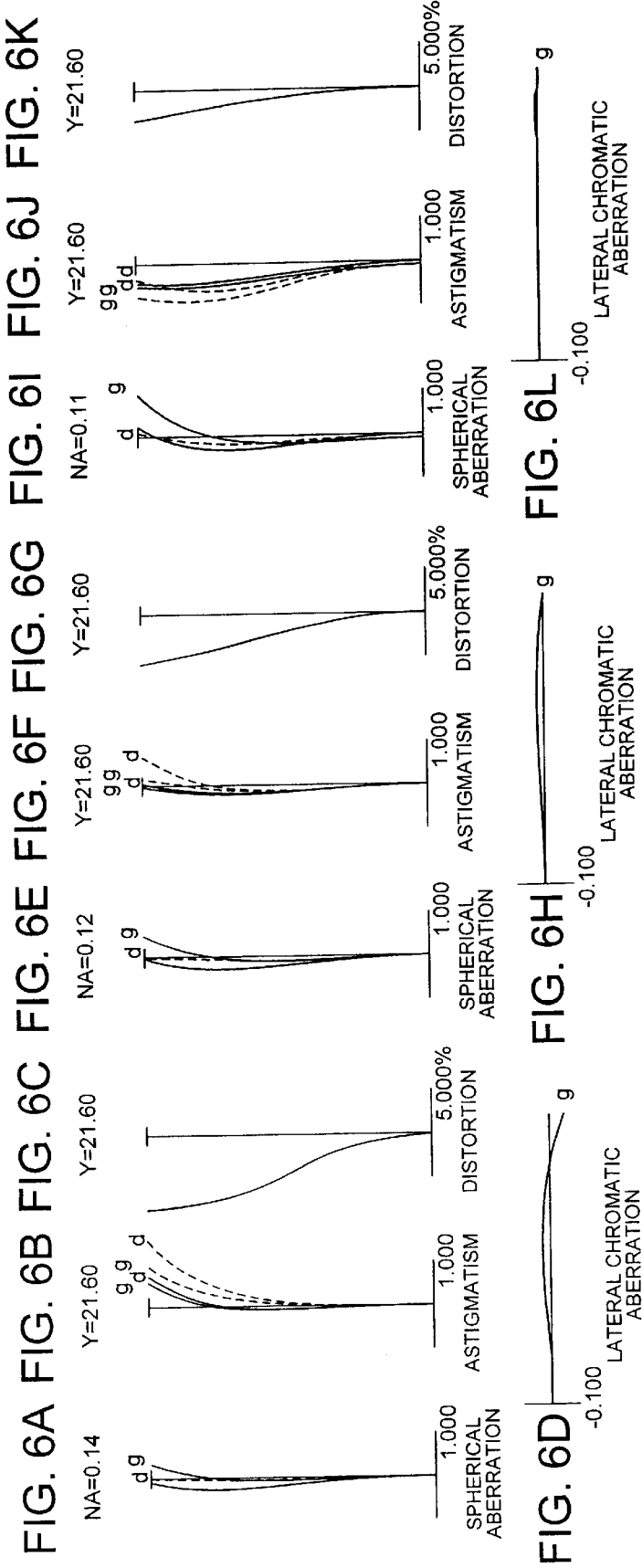

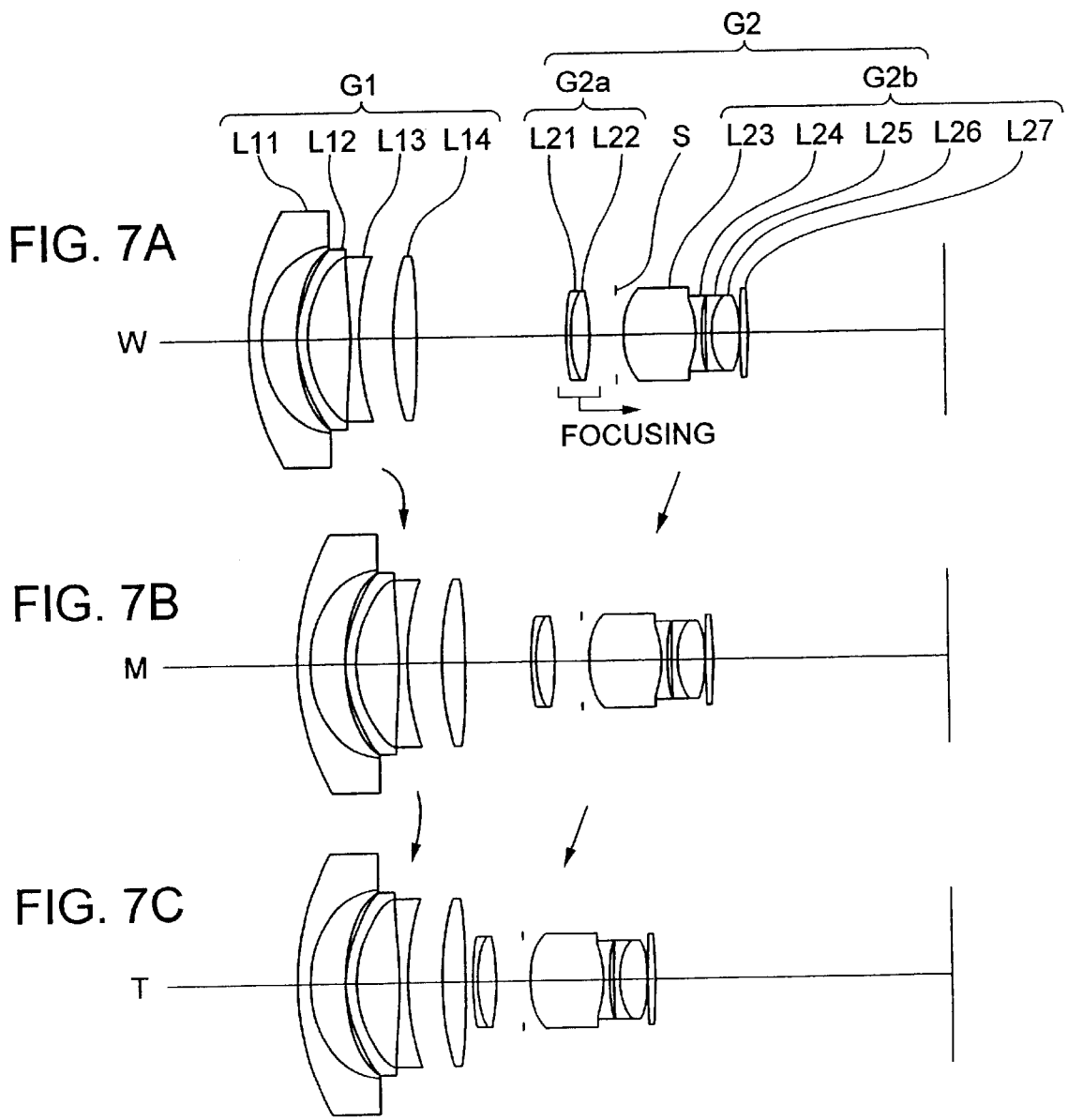

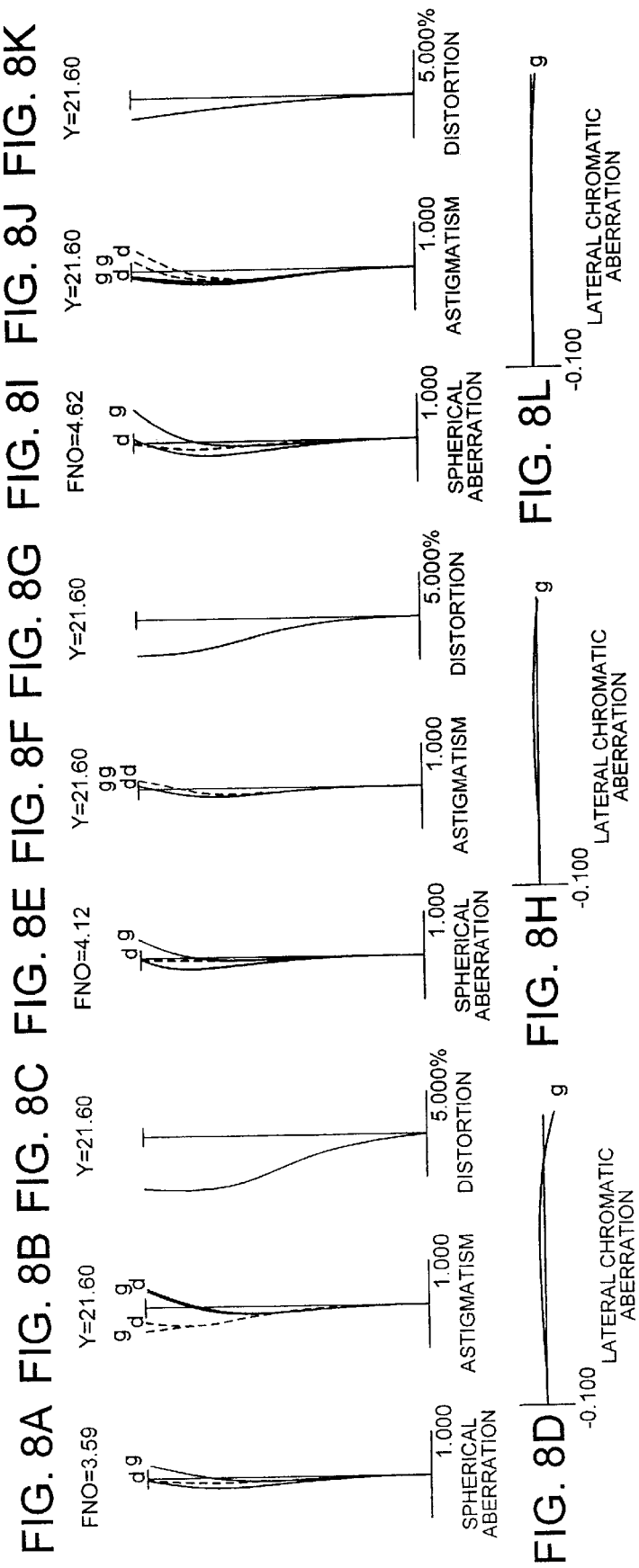

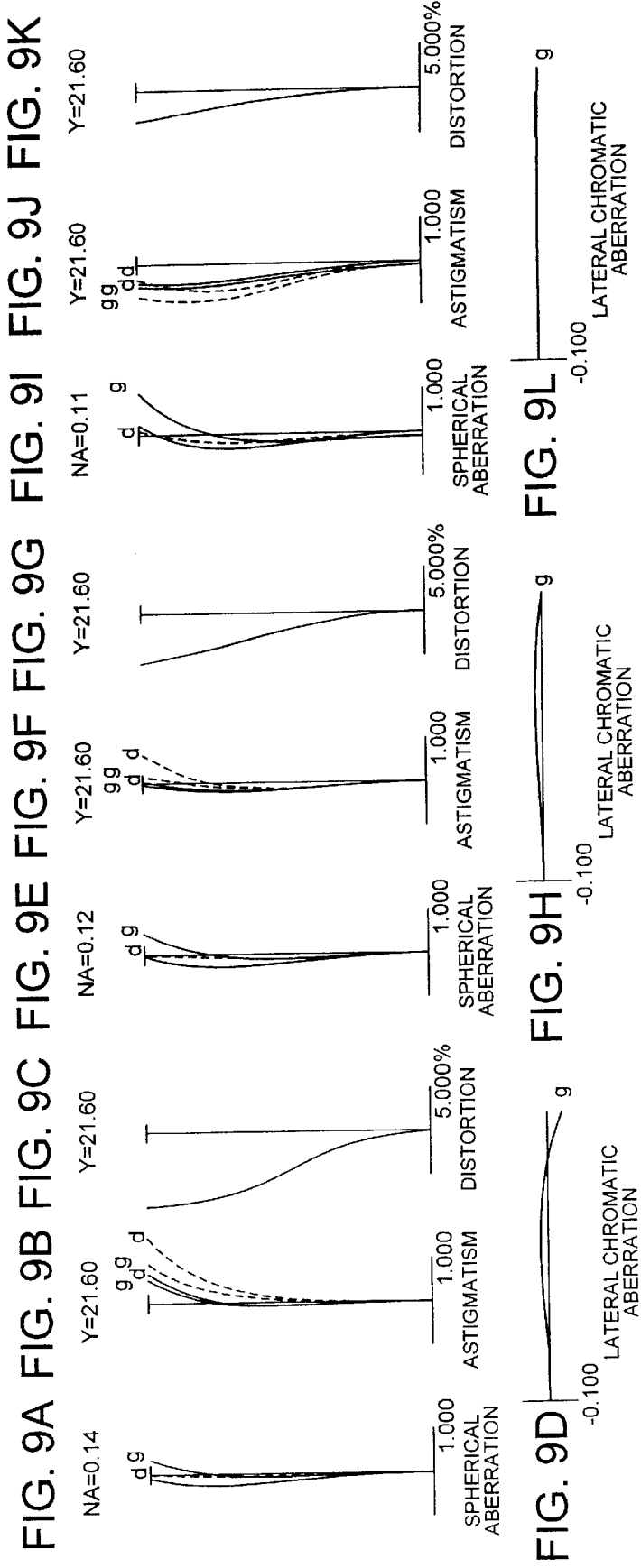

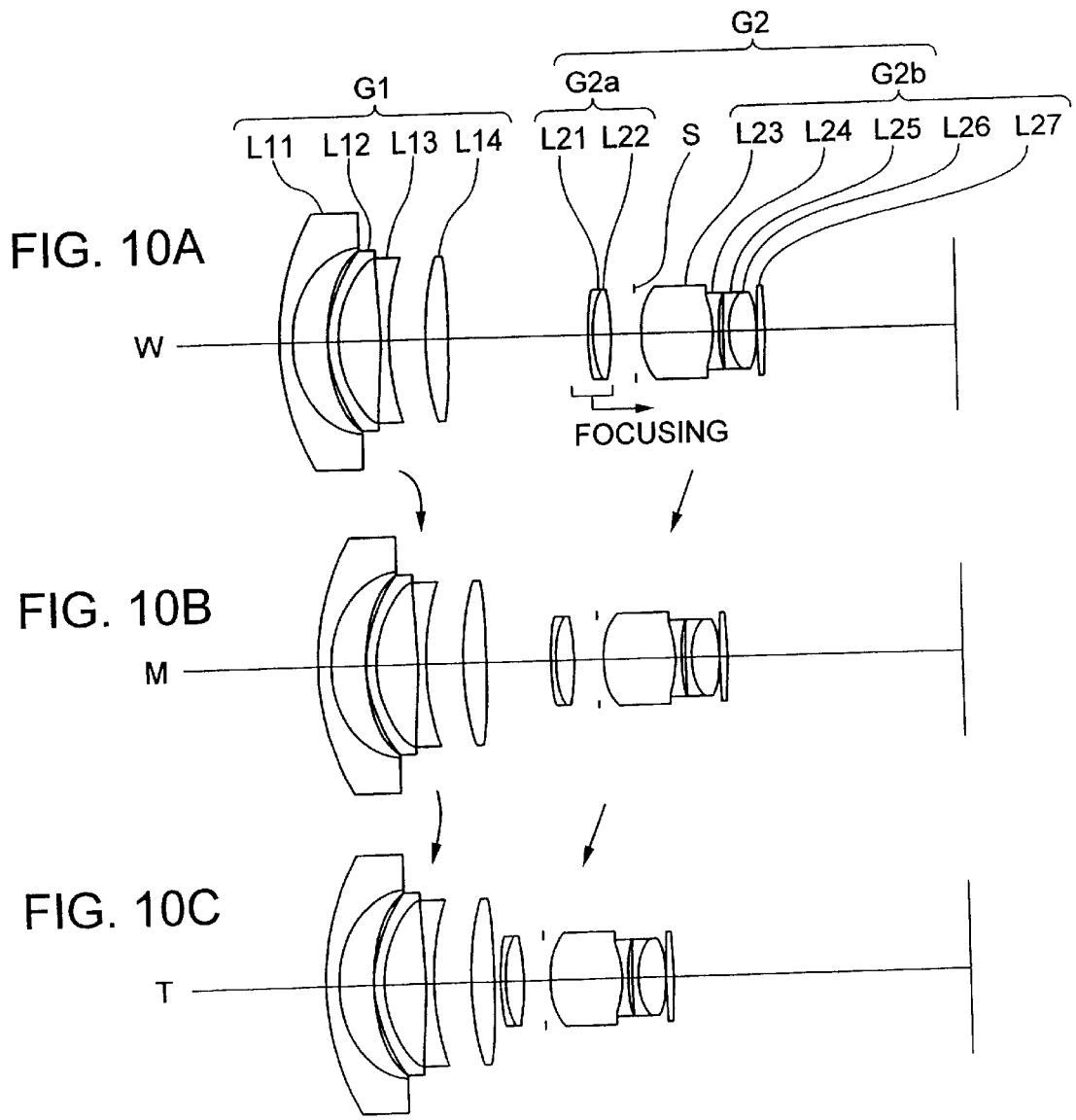

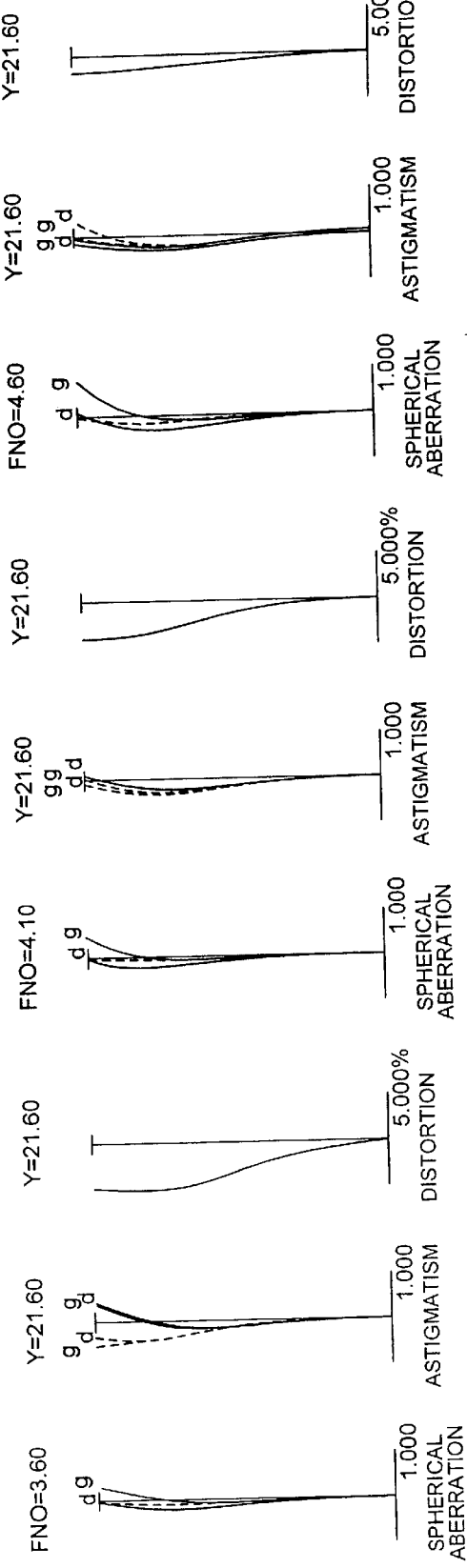

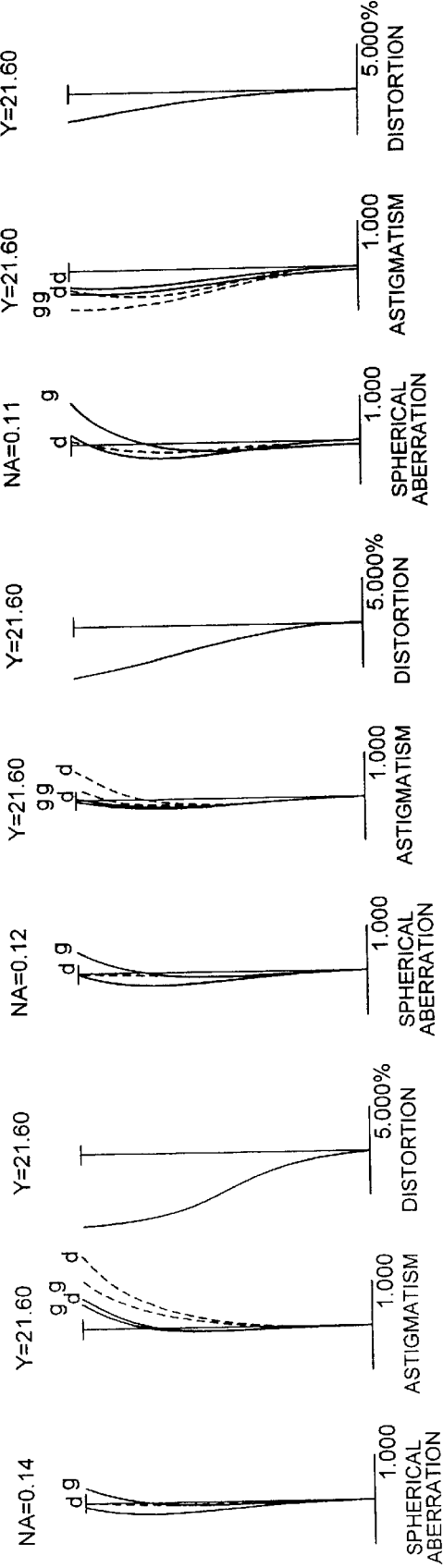

ZOOM LENS SYSTEM

The disclosures of the following priority applications are herein incorporated by reference:

Japanese Patent Application No. 2000-70781 filed Mar. 14, 2000

Japanese Patent Application No. 2001-55060 filed Feb. 28, 2001

BACKGROUND OF THE INVENTION

1. Field of the Invention

The present invention relates to a zoom lens system and, in particular, relates to an inner-focusing type zoom lens system with a wide angle of view suitable for a single lens reflex camera and the like.

2. Description of Related Art

A number of zoom lens systems consisting of, in order from an object side, a negative lens group and a positive lens group have been proposed. However, there has been no proposals for super-wide zoom lens systems having an angle of view of more than 100° and a zoom ratio of 1.7 or more. For example, Japanese Patent Post-Exam Publication No. 60-34734 proposes a wide zoom lens system consisting of two lens groups, a negative lens group and a positive lens group. Although the zoom lens system disclosed in Japanese Patent Post-Exam Publication No. 60-34734 satisfactory corrects distortion by using an aspherical surface, the maximum angle of view is about 86° and the zoom ratio is also less than 1.5. Moreover, when the focusing operation is carried out by moving the first lens group, the principal ray passes away from the optical axis with focusing on near object, so that the diameter of the first lens group becomes large in order to keep sufficient light quantity. Further, when the diameter becomes large, it causes a problem that the lens becomes heavy. Furthermore, when the focusing operation is carried out by the first lens group that is relatively heavy, it causes another problem that the focusing speed while performing auto-focusing becomes slow in comparison with a inner-focusing type or a rear-focusing type.

Accordingly, a wide zoom lens system with inner focusing method consisting of a negative lens group and a positive lens group has been proposed in, for example, Japanese Laid-Open Patent Application Nos. 8-327907 and 4-15612. In the zoom lens system disclosed in Japanese Laid-Open Patent Application No. 8-327907, although the zoom ratio is about two, the angle of view is only 83°. Moreover, in the zoom lens system disclosed in Japanese Laid-Open Patent Application No. 4-15612, although the angle of view is 112.7°, the zoom ratio is only about 1.4.

SUMMARY OF THE INVENTION

The present invention is made in view of the aforementioned problems and has an object to provide an inner-focusing type zoom lens system consisting of two lens groups, a negative lens group and a positive lens group, with the maximum angle of view of more than 100° and the zoom ratio of 1.7 or more.

According to one aspect of the present invention, a zoom lens system includes, in order from the object side, a first lens group having a negative refractive power, and a second lens group having a positive refractive power. Zooming operation is carried out by changing the interval between the first lens group G1 and the second lens group G2. The second lens group includes, in order from the object side, a front second lens group having a positive refractive power, and a rear second lens group a having positive refractive power. Focusing operation is carried out by moving the front second group to the image side. The following conditional expression is satisfied;

$$0.002 < \Sigma\{1/(n_i \cdot f_i)\} < 0.004$$

where $n_i$ denotes refractive index for d-line ($\lambda$=587.56 nm) of the i-th lens element counted from the object side, $f_i$ denotes the focal length for d-line ($\lambda$=587.56 nm) of the i-th lens element counted from the object side, and the summation is to be carried out from the first lens surface to the last lens surface.

In one preferred embodiment of the present invention, the following conditional expression is satisfied;

$$1.3 < f_{21}/f_{22} < 1.5$$

where $f_{21}$ denotes the focal length of the front second lens group, and $f_{22}$ denotes the focal length of the rear second lens group.

In one preferred embodiment of the present invention, the first lens group includes at least three negative lenses and at least one positive lens. A surface of the aforementioned at least three negative lenses is an aspherical surface satisfying the following conditional expression:

$$2 < X(14) - X(7) < 2.5$$

where X(y) is denoted by the following aspherical expression:

$$X(y) = (y^2/r) / \left[ 1 + \{1 - \kappa(y/r)^2\}^{1/2} \right] + C_2 y^2 + C_4 y^4 + C_6 y^6 + C_8 y^8 + C_{10} y^{10}$$

where X(14) denotes the displacement along the optical axis from the osculating (tangential) plane at the vertex of the aspherical surface denoted by the above aspherical expression at the height y=14 mm, X(7) denotes the displacement along the optical axis from the osculating plane at the vertex of the aspherical surface denoted by the above aspherical expression at the height y=7 mm, r denotes a paraxial radius of curvature, $\kappa$ denotes the conical coefficient, and $C_n$ denotes the aspherical surface coefficient of n-th order.

According to one aspect of the present invention, a zoom lens system includes, in order from the object side, a first lens group having a negative refractive powers and a second lens group having a positive refractive power. Zooming operation is carried out by changing the interval between the first lens group G1 and the second lens group G2. The second lens group includes, in order from the object side, a front second lens group having a positive refractive power, and a rear second lens group having a positive refractive power. Focusing operation is carried out by moving the front second group to the image side. The following conditional expression is satisfied:

$$1.3 < f_{21}/f_{22} < 1.5$$

where $f_{21}$ denotes the focal length of the front second lens group, and $f_{22}$ denotes the focal length of the rear second lens group.

According to one aspect of the present invention, a zoom lens system includes, in order from the object side, a first lens group having negative refractive power, and a second lens group having positive refractive power. Zooming operation is carried out by changing the interval between the first lens group G1 and the second lens group G2. The zoom lens system has a maximum angle of view of 100° or more of a zooming range. The second lens group includes, in order from the object side, a front second lens group having positive refractive power and a rear second lens group having positive refractive power. Focusing operation is carried out by moving the front second group to the image side.

In one preferred embodiment of the present invention, the zoom lens system has the zoom ratio of 1.7 or more.

Further, it is preferably that the zoom lens system has the zoom ratio of 1.8 or more.

BRIEF DESCRIPTION OF THE DRAWINGS

FIGS. 1A–1C are diagrams showing a zoom lens construction according to Example 1 of the present invention and the state of lens group positions from a wide-angle end state (W) to a telephoto end state (T).

FIGS. 2A–2L are graphs showing various aberrations of the zoom lens system according to Example 1 of the present invention focused on infinity in the wide-angle end state of FIGS. 2A–2D, in an intermediate focal length state of FIGS. 2E–2H, and in the telephoto end state of FIGS. 2I–2L, respectively.

FIGS. 3A–3L are graphs showing various aberrations of the zoom lens system according to Example 1 of the present invention focused on R=0.33 m in the wide-angle end state of FIGS. 3A–3D, in the intermediate focal length state of FIGS. 3E–3H, and in the telephoto end state of FIGS. 3I–3L, respectively.

FIGS. 4A–4C are diagrams showing a zoom lens construction according to Example 2 of the present invention and the state of lens group positions from a wide-angle end state (W) to a telephoto end state (T).

FIGS. 5A–5L are graphs showing various aberrations of the zoom lens system according to Example 2 of the present invention focused on infinity in the wide-angle end state of FIGS. 5A–5D, in an intermediate focal length state of FIGS. 5E–5H, and in the telephoto end state of FIGS. 5I–5L, respectively.

FIGS. 6A–6L are graphs showing various aberrations of the zoom lens system according to Example 2 of the present invention focused on R=0.33 m in the wide-angle end state of FIGS. 6A–6D, in the intermediate focal length state of FIGS. 6E–6H, and in the telephoto end state of FIGS. 6I–6L, respectively.

FIGS. 7A–7C are diagrams showing a zoom lens construction according to Example 3 of the present invention and the state of lens group positions from a wide-angle end state (W) to a telephoto end state (T).

FIGS. 8A–8L are graphs showing various aberrations of the zoom lens system according to Example 3 of the present invention focused on infinity in the wide-angle end state of FIGS. 8A–8D, in an intermediate focal length state of FIGS. 8E–8H, and in the telephoto end state of FIGS. 8I–8L, respectively.

FIGS. 9A–9L are graphs showing various aberrations of the zoom lens system according to Example 3 of the present invention focused on R=0.33 m in the wide-angle end state of FIGS. 9A–9D in the intermediate focal length state of FIGS. 9E–9H, and in the telephoto end state of FIGS. 9I–9L, respectively.

FIGS. 10A–10C are diagrams showing a zoom lens construction according to Example 4 of the present invention and the state of lens group positions from a wide-angle end state (W) to a telephoto end state (T).

FIGS. 11A–11L are graphs showing various aberrations of the zoom lens system according to Example 4 of the present invention focused on infinity in the wide-angle end state of FIGS. 11A–11D, in an intermediate focal length state of FIGS. 11E–11H, and in the telephoto end state of FIGS. 11I–11L, respectively.

FIGS. 12A–12L are graphs showing various aberrations of the zoom lens system according to Example 4 of the present invention focused on R=0.33 m in the wide-angle end state of FIGS. 12A–12D, in the intermediate focal length state of FIGS. 12E–12H, and in the telephoto end state of FIGS. 12I–12L, respectively.

DESCRIPTION OF THE PREFERRED EMBODIMENTS

A zoom lens system according to the present invention adopts a two-lens-groups construction consisting of a negative lens group and a positive lens group. This is because by using fewer lens groups, the number of parts can be reduced so as to reduce the manufacturing cost. Moreover, since a wide angel lens has a lot of surfaces whose radius of curvature is small, a ghost image caused by reflections on lens surfaces is liable to occur. So with fitting a hood, unnecessary light is removed. A "flower type" hood capable of removing unnecessary light effectively is often used for a wide-angle lens. The flower type hood is a hood that is mechanically processed in petals shape in order to effectively shield a light producing ghost images. Furthermore, when the focusing type is a "first-lens-group focusing" type, the flower type hood cannot be fitted because the first lens group carries out focusing operation by rotating itself. Even if it can be made to fit, it is not preferable that the mechanical construct on becomes complicated. On the other hand, in an inner focusing type, since the focusing operation can be carried out without rotating the first lens group, the flower type hood can be fitted without complicated construction. Moreover, since focusing is carried out by the second lens group which is smaller than the first lens group, focusing velocity can be made faster.

Each conditional expression will be explained below.

Conditional expression (1) defines an appropriate range of Petzval sum. When the value exceeds the upper limit of conditional expression (1), spherical aberration in the telephoto side becomes excessively large in negative direction, so that good optical performance at the center of an image cannot be obtained. On the other hand, when the value falls below the lower limit of conditional expression (1), the variation of curvature of field in the telephoto side in accordance with focusing distance becomes large, so that it becomes difficult to obtain good optical performance all over the image field. The upper and lower limits of conditional expression (1) are more preferably set to be 0.00360 and 0.00300, respectively.

Conditional expression (2) defines an appropriate range of a ratio of the focal length of the front group to that of the rear group of the second lens group. When the ratio exceeds the upper limit of conditional expression (2), a moving distance for focusing operation becomes large, so that it is undesirable that the total lens length becomes long. On the other hand, when the ratio falls below the lower limit of conditional expression (2), the back focal length in the wide-angle end state becomes short, so that the space for the mirror required for a single lens reflex camera cannot be secured.

Conditional expression (3) defines an appropriate range of the focal length of the first lens group to that of the zoom lens system in the wide-angle end state. When the ratio exceeds the upper limit of conditional expression (3), the diameter of the first lens group becomes large, so that it is undesirable for compactness. On the other hand, when the ratio falls below the lower limit of conditional expression (3), distortion in the wide-angle end state becomes large, so it is undesirable.

Conditional expression (4) defines an appropriate range of difference in refractive index between a negative lens and a positive lens comprising the cemented lens. When the value falls below the lower limit of conditional expression (4), the radius of curvature of the cemented surface becomes small, so that the bend of lateral chromatic aberration becomes large.

Conditional expression (5) defines an appropriate range of difference in Abbe number between a negative lens and a positive lens comprising the cemented lens. When the value falls below the lower limit of conditional expression (5), lateral chromatic aberration particularly in the wide-angle side becomes difficult to correct, so that even if lateral chromatic aberration in the vicinity of optical axis is small, off-axis lateral chromatic aberration becomes large. In the super wide zoom lens system, curvature of field and distortion are liable to become large. Generally, the correction directions of curvature of field and distortion are opposite with each other, so that if curvature of field is tried to correct, distortion becomes larger. Accordingly, in order to reduce burden on each surface and to reduce produced amounts of curvature of field and distortion, it is preferable to have three negative lenses in the first lens group in the case of a two-lens-groups zoom lens system consisting of a negative lens group and a positive lens group. Moreover, in order to correct curvature of field and distortion well, an aspherical surface is effective.

Conditional expression (6) defines an appropriate shape of an aspherical surface. When the value X(14)-X(7) exceeds the upper limit of conditional expression (6), the aspherical surface becomes difficult to form, so that it is undesirable. On the other hand, when the value falls below the lower limit of conditional expression (6), the effect of the aspherical surface becomes weak, so that curvature of field and distortion cannot be corrected well.

The numerical examples of the zoom lens system according to the present invention will be explained below with reference to accompanying drawings. In each example, the zoom lens system consists of, in order from the object side, a first lens group G1 having a negative refractive power and a second lens group G2 having a positive refractive power. Zooming operation is carried out by changing the interval between the first lens group G1 and the second lens group G2. The second lens group consists of, in order from the object side, a front second lens group G2a having a positive refractive power and a rear second lens group G2b having a positive refractive power. Focusing operation from infinity to near object is carried out by moving the front second lens group G2a to the image side.

Moreover, in each example, an aspherical surface is expressed by the following expression:

$$X(y) = (y^2/r)/[1 + \{1 - \kappa(y/r)^2\}^{1/2}] + C_2 y^2 + C_4 y^4 + C_6 y^6 + C_8 y^8 + C_{10} y^{10}$$

where y denotes the height in a vertical direction relative to the optical axis, X(y) denotes a displacement along the optical axis at the height y, r denotes a paraxial radius of curvature, κ denotes the conical coefficient, and $C_n$ denotes the aspherical surface coefficient of n-th order.

In the respective examples, the aspherical surface is denoted by adding a mark "*" to the right side of the surface number.

In various aberrations shown in each embodiment, the unit is to be "mm".

<Example 1>

FIGS. 1A–1C are diagrams showing a zoom lens construction according to Example 1 of the present invention and the state of lens group positions from a wide-angle end state (W) to a telephoto end state (T). The zoom lens system consists of, in order from the object side, a first lens group G1 having a negative refractive power and a second lens group G2 having a positive refractive power. The first lens group G1 consists of, in order from the object side, a negative meniscus lens L11 having a convex surface facing to the object side, a negative meniscus lens L12 having a convex surface facing to the object side, a double concave lens L13, and a double convex lens L14. The second lens group G2 consists of a front second lens group G2a which is a cemented lens composed of a negative meniscus lens L21 having a convex surface facing to the object side and a double convex lens L22, and a rear second lens group G2b consisting of a cemented lens composed of a double convex lens L23 and a double concave lens L24, a cemented lens composed of a negative meniscus lens L25 having a convex surface facing to the object side and a double convex lens L26, and a double convex lens L27. An aperture stop is arranged between the front second lens group G2a and the rear second lens group G2b.

When zooming operation is carried out from a wide-angle end state (W) to a telephoto end state (T), the respective lens groups move along the optical axis in accordance with the zooming trajectory shown by arrows in FIGS. 1A–1C. Moreover, focusing operation from infinity to near object is carried out by moving the front second lens group G2a to the image side.

Various values associated with Example 1 are listed in Table 1. In Table 1, f denotes the focal length, FNO denotes the f-number, 2ω denotes an angle of view, R denotes a shooting distance (a distance from the object to the image), d0 denotes a distance from the object to the first lens surface, and Bf denotes the back focal length. The surface number denotes the order of the lens surfaces along the optical axis in order from the object side. The refractive index and Abbe number show values for d-line (λ=587.6 nm). In various values of all examples listed below are denoted by the same symbols used in Example 1.

TABLE 1

| f (mm) | 18.5 | ~ | 25 | ~ | 34 |
|---|---|---|---|---|---|
| Fno | 3.60 | ~ | 4.13 | ~ | 4.63 |
| 2 ω | 101.79° | ~ | 83.78° | ~ | 65.95° |

| surface number | radius of curvature | surface distance | refractive index | Abbe number |
|---|---|---|---|---|
| 1) | 50.8647 | 2.5000 | 1.794997 | 45.30 |
| 2) | 19.4698 | 7.0000 | 1.000000 | |
| 3)* | 44.6225 | 0.1000 | 1.506250 | 55.63 |
| 4) | 28.5637 | 2.0000 | 1.794997 | 45.30 |
| 5) | 22.1750 | 8.2000 | 1.000000 | |
| 6) | −121.0976 | 1.7000 | 1.744000 | 44.79 |
| 7) | 49.6768 | 6.8000 | 1.000000 | |
| 8) | 58.0531 | 4.5000 | 1.795040 | 28.56 |
| 9) | −148.4701 | d9 | 1.000000 | |
| 10) | 51.4552 | 1.0000 | 1.788000 | 47.38 |
| 11) | 22.8785 | 3.8000 | 1.501370 | 56.41 |
| 12) | −55.6169 | d12 | 1.000000 | |
| 13> | ∞ | 1.5000 | 1.000000 | aperture stop S |

TABLE 1-continued

| | | | | |
|---|---|---|---|---|
| 14) | 17.6455 | 14.2000 | 1.539960 | 59.47 |
| 15) | −26.1699 | 1.3000 | 1.794997 | 45.30 |
| 16) | 30.7167 | 0.7000 | 1.000000 | |
| 17) | 78.5727 | 1.3000 | 1.834000 | 37.35 |
| 18) | 14.0744 | 5.3000 | 1.497820 | 82.52 |
| 19) | −23.1281 | 0.1000 | 1.000000 | |
| 20) | 162.2331 | 1.6000 | 1.539960 | 59.47 |
| 21) | −162.2331 | Bf | 1.000000 | | aspherical coefficient
<surface number 3>

$\kappa = 5.5041$
$C\,2 = 0.00000$
$C\,4 = 7.12980 \times 10^{-6}$
$C\,6 = -2.10910 \times 10^{-9}$
$C\,8 = 3.33500 \times 10^{-11}$
$C\,10 = -2.45390 \times 10^{-14}$ Variable intervals during zooming

| f | 18.50000 | 25.00000 | 34.00000 |
|---|---|---|---|
| R | ∞ | ∞ | ∞ |
| d9 | 28.43082 | 12.78091 | 0.99036 |
| d12 | 5.19765 | 5.19765 | 5.19765 |
| Bf | 38.47960 | 46.68786 | 58.05315 |
| R | 0.33 m | 0.33 m | 0.33 m |
| d0 | 194.2919 | 201.7339 | 202.1591 |
| d9 | 32.39782 | 16.60395 | 4.97107 |
| d12 | 1.23064 | 1.37461 | 1.21693 |
| Bf | 38.47960 | 46.68786 | 58.05315 | values for the conditional expressions (1) $\Sigma\{1/(n_i \cdot f_i)\} = 0.00337$
(2) $f21/f22 = 1.37$
(3) $|f1|/fw = 1.605$
(4) $n1 - n2 = 0.336$
(5) $\upsilon 2 - \upsilon 1 = 45.17$
(6) $X(14) - X(7) = 2.333$ FIGS. 2A–2L, 3A–3L are graphs showing various aberrations of the zoom lens system according to Example 1 of the present invention. FIGS. 2A–2D show various aberrations focused on infinity in the wide-angle end state (minimum focal length state). FIGS. 2E–2H show various aberrations focused on infinity in an intermediate focal length state. FIGS. 2I–2L show various aberrations focused on infinity in the telephoto end state (maximum focal length state). FIGS. 3A–3D show various aberrations focused on R=0.33 m in the wide-angle end state. FIGS. 3E–3H show various aberrations focused on R=0.33 m in the intermediate focal length state. FIGS. 3I–3L show various aberrations focused on R=0.33 m in the telephoto end state.

In each aberration diagrams shown above, FNO denotes the f-number, NA denotes the numerical aperture, y denotes image height, d denotes d-line (λ=587.6 nm), and g denotes g-line (λ=435.8 nm), respectively. In the diagram showing astigmatism, a solid line indicates a sagittal image plane and a broken line indicates a meridional image plane. In the diagram showing spherical aberration, a solid line indicates spherical aberration, a broken line indicates the sine condition. Lateral chromatic aberration are values for the g-line. As apparent from the respective diagrams showing various aberrations, excellent compensation is made for the various aberrations at the respective image distances and at the respective focal lengths.

<Example 2>

FIGS. 4A–4C are diagrams showing a zoom lens construction according to Example 2 of the present invention and the state of lens group positions from a wide-angle end state (W) to a telephoto end state (T). The zoom lens system consists of, in order from the object side, a first lens group G1 having a negative refractive power and a second lens group G2 having a positive refractive power. The first lens group G1 consists of, in order from the object side, a negative meniscus lens L11 having a convex surface facing to the object side, a negative meniscus lens L12 having a convex surface facing to the object side, a double concave lens L13, and a double convex lens L14. The second lens group G2 consists of a front second lens group G2a which is a cemented lens composed of a negative meniscus lens L21 having a convex surface facing to the object side and a double convex lens L22, and a rear second lens group G2b consisting of a cemented lens composed of a double convex lens L23 and a double concave lens L24, a cemented lens composed of a negative meniscus lens L25 having a convex surface facing to the object side and a double convex lens L26, and a double convex lens L27. An aperture stop is arranged between the front second lens group G2a and the rear second lens group G2b.

When zooming operation is carried out from a wide-angle end state (W) to a telephoto end state (T), the respective lens groups move along the optical axis in accordance with the zooming trajectory shown by arrows in FIGS. 4A–4C. Moreover, focusing operation from infinity to near object is carried out by moving the front second lens group G2a to the image side. Various values associated with Example 2 are listed in Table 2.

TABLE 2

| f (mm) | 18.5 | 25 | 34 |
|---|---|---|---|
| Fno | 3.59 | 4.12 | 4.62 |
| 2 ω | 101.84° | 83.77° | 65.93° |

| surface number | radius of curvature | surface distance | refractive index | Abbe number |
|---|---|---|---|---|
| 1) | 50.7591 | 2.5000 | 1.794997 | 5.30 |
| 2) | 19.4090 | 7.0000 | 1.000000 | |
| 3)* | 44.2666 | 0.1000 | 1.506250 | 55.63 |
| 4) | 28.8114 | 2.0000 | 1.794997 | 45.30 |
| 5) | 22.1978 | 8.2000 | 1.000000 | |
| 6) | −121.5705 | 1.7000 | 1.744000 | 44.79 |
| 7) | 49.8450 | 6.8000 | 1.000000 | |
| 8) | 58.0463 | 4.5000 | 1.795040 | 28.56 |
| 9) | −149.1721 | d9 | 1.000000 | |
| 10) | 51.0290 | 1.0000 | 1.788000 | 47.38 |
| 11) | 23.0254 | 3.8000 | 1.501370 | 56.41 |
| 12) | −54.9749 | d12 | 1.000000 | |
| 13> | ∞ | 1.5000 | 1.000000 | aperture stop S |
| 14) | 17.6537 | 14.2000 | 1.539960 | 59.47 |
| 15) | −27.2848 | 1.3000 | 1.794997 | 45.30 |
| 16) | 32.2874 | 0.7000 | 1.000000 | |
| 17) | 110.4491 | 1.3000 | 1.834000 | 37.35 |
| 18) | 14.0339 | 5.3000 | 1.497820 | 82.52 |
| 19) | −23.3591 | 0.1000 | 1.000000 | |
| 20) | 138.2833 | 1.6000 | 1.539960 | 59.47 |
| 21) | −138.2833 | Bf | 1.000000 | | aspherical coefficient
<surface number 3>

$\kappa = 5.4350$
$C\,2 = 0.00000$
$C\,4 = 7.18760 \times 10^{-6}$
$C\,6 = -3.64120 \times 10^{-9}$
$C\,8 = 3.99180 \times 10^{-11}$
$C\,10 = -3.32250 \times 10^{-14}$ Variable intervals during zooming

| f | 18.50037 | 25.00067 | 34.00123 |
|---|---|---|---|
| R | ∞ | ∞ | ∞ |
| d9 | 28.42071 | 12.78191 | 0.99974 |
| d12 | 5.16566 | 5.16566 | 5.16566 |

TABLE 2-continued

| Bf | 38.29481 | 46.49762 | 57.85554 |
|---|---|---|---|
| R | 0.33 m | 0.33 m | 0.33 m |
| d0 | 187.8488 | 195.2848 | 195.7094 |
| d9 | 32.42986 | 16.60590 | 4.95936 |
| d12 | 1.15651 | 1.34167 | 1.20604 |
| Bf | 38.29481 | 46.49762 | 57.85554 | values for the conditional expressions (1) $\Sigma\{1/(n_i \cdot f_i)\} = 0.00332$
(2) $f21/f22 = 1.312$
(3) $|f1|/fw = 1.605$
(4) $n1 - n2 = 0.336$
(5) $\upsilon 2 - \upsilon 1 = 45.17$
(6) $X(14) - X(7) = 2.34$ FIGS. 5A–5L, 6A–6L are graphs showing various aberrations of the zoom lens system according to Example 2 of the present invention. FIGS. 5A–5D show various aberrations focused on infinity in the wide-angle end state (minimum focal length state). FIGS. 5E–5H show various aberrations focused on infinity in an intermediate focal length state. FIGS. 5I–5L show various aberrations focused on infinity in the telephoto end state (maximum focal length state). FIGS. 6A–6D show various aberrations focused on R=0.33 m in the wide-angle end state. FIGS. 6E–6H show various aberrations focused on R=0.33 m in the intermediate focal length state. FIGS. 6I–6L show various aberrations focused on R=0.33 m in the telephoto end state. As apparent from the respective diagrams showing various aberrations, excellent compensation is made for the various aberrations at the respective image distances and at the respective focal lengths.

<Example 3>

FIGS. 7A–7C are diagrams showing a zoom lens construction according to Example 3 of the present invention and the state of lens group positions from a wide-angle end state (W) to a telephoto end state (T). The zoom lens system consists of, in order from the object side, a first lens group G1 having a negative refractive power and a second lens group G2 having a positive refractive power. The first lens group G1 consists of, in order from the object side, a negative meniscus lens L11 having a convex surface facing to the object side, a negative meniscus lens L12 having a convex surface facing to the object side, a double concave lens L13, and a double convex lens L14 The second lens group G2 consists of a front second lens group G2a which is a cemented lens composed of a negative meniscus lens L21 having a convex surface facing to the object side and a double convex lens L22, and a rear second lens group G2b consisting of a cemented lens composed of a double convex lens L23 and a double concave lens L24, a cemented lens composed of a negative meniscus lens L25 having a convex surface facing to the object side and a double convex lens L26, and a double convex lens L27. An aperture stop is arranged between the front second lens group G2a and the rear second lens group G2b.

When zooming operation is carried out from a wide-angle end state (W) to a telephoto end state (T), the respective lens groups move along the optical axis in accordance with the zooming trajectory shown by arrows in FIGS. 7A–7C. Moreover, focusing operation from infinity to near object is carried out by moving the front second lens group G2a to the image side. Various values associated with Example 3 are listed in Table 3.

TABLE 3

| f (mm) | 18.5 | 25 | 34 |
|---|---|---|---|
| Fno | 3.59 | 4.12 | 4.62 |
| 2 ω | 101.83° | 83.77° | 65.93° |

| surface number | radius of curvature | surface distance | refractive index | Abbe number |
|---|---|---|---|---|
| 1) | 50.7591 | 2.5000 | 1.794997 | 45.30 |
| 2) | 19.4090 | 7.0000 | 1.000000 | |
| 3)* | 44.8006 | 0.1000 | 1.495210 | 56.34 |
| 4) | 28.8114 | 2.0000 | 1.794997 | 45.30 |
| 5) | 22.1978 | 8.2000 | 1.000000 | |
| 6) | −121.5705 | 1.7000 | 1.744000 | 44.79 |
| 7) | 49.8450 | 6.8000 | 1.000000 | |
| 8) | 58.0463 | 4.5000 | 1.795040 | 28.56 |
| 9) | −149.1721 | d9 | 1.000000 | |
| 10) | 51.0290 | 1.0000 | 1.788000 | 47.38 |
| 11) | 23.0254 | 3.8000 | 1.501370 | 56.41 |
| 12) | −54.9749 | d12 | 1.000000 | |
| 13> | ∞ | 1.5000 | 1.000000 | aperture stop S |
| 14) | 17.6537 | 14.2000 | 1.539960 | 59.47 |
| 15) | −27.2848 | 1.3000 | 1.794997 | 45.30 |
| 16) | 32.2874 | 0.7000 | 1.000000 | |
| 17) | 110.4491 | 1.3000 | 1.834000 | 37.35 |
| 18) | 14.0339 | 5.3000 | 1.497820 | 82.52 |
| 19) | −23.3591 | 0.1000 | 1.000000 | |
| 20) | 138.2833 | 1.6000 | 1.539960 | 59.47 |
| 21) | −138.2833 | 57.8540 | 1.000000 | | aspherical coefficient
<surface number 3>

κ = 5.5925
C 2 = 0.00000
C 4 = 7.47740 × $10^{-6}$
C 6 = −3.47650 × $10^{-9}$
C 8 = 3.97170 × $10^{-11}$
C 10 = −2.91570 × $10^{-14}$

Variable intervals during zooming

| f | 18.50000 | 25.00000 | 34.00000 |
|---|---|---|---|
| R | ∞ | ∞ | ∞ |
| d9 | 28.42071 | 12.78191 | 0.99974 |
| d12 | 5.16566 | 5.16566 | 5.16566 |
| Bf | 38.29435 | 46.49679 | 57.85400 |
| R | 0.33 m | 0.33 m | 0.33 m |
| d0 | 194.5193 | 201.9559 | 202.3809 |
| d9 | 32.41165 | 16.58906 | 4.94194 |
| d12 | 1.17472 | 1.35851 | 1.22346 |
| Bf | 38.29435 | 46.49679 | 57.85400 | values for the conditional expressions (1) $\Sigma\{1/(n_i \cdot f_i)\} = 0.00329$
(2) $f21/f22 = 1.312$
(3) $|f1|/fw = 1.605$
(4) $n1 - n2 = 0.336$
(5) $\upsilon 2 - \upsilon 1 = 45.17$
(6) $X(14) - X(7) = 2.34$ FIGS. 8A–8L, 9A–9L are graphs showing various aberrations of the zoom lens system according to Example 3 of the present invention FIGS. 8A–8D show various aberrations focused on infinity in the wide-angle end state (minimum focal length state). FIGS. 8E–8H show various aberrations focused on infinity in an intermediate focal length state. FIGS. 8I–8L show various aberrations focused on infinity in the telephoto end state (maximum focal length state). FIGS. 9A–9D show various aberrations focused on R=0.33 m in the wide-angle end state. FIGS. 9E–9H show various aberrations focused on R=0.33 m in the intermediate focal length state. FIGS. 9I–9L show various aberrations focused on R=0.33 m in the telephoto end state As apparent from the respective diagrams showing various aberrations, excellent compensation is made for the various aberrations at the respective image distances and at the respective focal lengths.

<Example 3>

FIGS. 10A–10C are diagrams showing a zoom lens construction according to Example 4 of the present invention and the state of lens group positions from a wide-angle end state (W) to a telephoto end state (T). The zoom lens system consists of, in order from the object side, a first lens group G1 having a negative refractive power and a second lens group G2 having a positive refractive power. The first lens group G1 consists of, in order from the object side, a negative meniscus lens L11 having a convex surface facing to the object side, a negative meniscus lens L12 having a convex surface facing to the object side, a double concave lens L13, and a double convex lens L14. The second lens group G2 consists of a front second lens group G2a which is a cemented lens composed of a negative meniscus lens L21 having a convex surface facing to the object side and a double convex lens L22, and a rear second lens group G2b consisting of a cemented lens composed of a double convex lens L23 and a double concave lens L24, a cemented lens composed of a negative meniscus lens L25 having a convex surface facing to the object side and a double convex lens L26, and a double convex lens L27. An aperture stop is arranged between the front second lens group G2a and the rear second lens group G2b.

When zooming operation is carried out from a wide-angle end state (W) to a telephoto end state (T), the respective lens groups move along the optical axis in accordance with the zooming trajectory shown by arrows in FIGS. 10A–10C. Moreover, focusing operation from infinity to near object is carried out by moving the front second lens group G2a to the image side. Various values associated with Example 4 are listed in Table 4.

TABLE 4

| f (mm) | 18.5 | 25 | 34 |
|---|---|---|---|
| Fno | 3.60 | 4.11 | 4.60 |
| 2 ω | 101.73° | 83.48° | 65.78° |

| surface number | radius of curvature | surface distance | refractive index | Abbe number |
|---|---|---|---|---|
| 1) | 50.8043 | 2.500 | 1.796681 | 45.37 |
| 2) | 20.5967 | 6.300 | 1.000000 | |
| 3)* | 44.5105 | 0.100 | 1.495210 | 56.34 |
| 4) | 29.6000 | 2.000 | 1.796681 | 45.37 |
| 5) | 22.7782 | 8.100 | 1.000000 | |
| 6) | −139.6787 | 1.7000 | 1.744000 | 45.00 |
| 7) | 39.1541 | 7.600 | 1.000000 | |
| 8) | 55.9871 | 4.800 | 1.795040 | 28.56 |
| 9) | −162.7617 | d9 | 1.000000 | |
| 10) | 51.5917 | 1.000 | 1.796681 | 45.37 |
| 11) | 22.0212 | 3.800 | 1.514540 | 54.55 |
| 12) | −54.5308 | d12 | 1.000000 | |
| 13> | ∞ | 1.000 | 1.000000 | aperture stop S |
| 14) | 17.9342 | 15.000 | 1.518230 | 58.90 |
| 15) | −23.2318 | 1.300 | 1.744000 | 45.00 |
| 16) | 31.1387 | 0.700 | 1.000000 | |
| 17) | 110.7867 | 1.300 | 1.834000 | 37.35 |
| 18) | 14.8278 | 5.300 | 1.497820 | 82.52 |
| 19) | −20.6243 | 0.100 | 1.000000 | |
| 20) | 106.7115 | 1.800 | 1.539960 | 59.60 |
| 21) | −746.1291 | Bf | 1.000000 | |

TABLE 4-continued aspherical coefficient
<surface number 3>

κ = 4.9067
C 2 = 0.00000
C 4 = 6.73270 × 10$^{-6}$
C 6 = 5.35590 × 10$^{-9}$
C 8 = 1.06490 × 10$^{-11}$
C 10 = 3.92820 × 10$^{-14}$

Variable intervals during zooming

| f | 18.50000 | 25.00000 | 34.00000 |
|---|---|---|---|
| R | ∞ | ∞ | ∞ |
| d9 | 28.21730 | 12.64142 | 0.90665 |
| d12 | 4.66091 | 4.66091 | 4.66091 |
| Bf | 38.05589 | 46.23280 | 57.55468 |
| R | 0.35 m | 0.35 m | 0.35 m |
| d0 | 214.6659 | 222.0650 | 222.4779 |
| d9 | 31.86189 | 16.13954 | 4.53625 |
| d12 | 1.01632 | 1.16279 | 1.03131 |
| Bf | 38.05589 | 46.23280 | 57.55468 | values for the conditional expressions (1) $\Sigma\{1/(n_i \cdot f_i)\}$ = 0.00315
(2) f21/f22 = 1.330
(3) |f1|/fw = 1.604
(4) n1 − n2 = 0.336
(5) υ2 − υ1 = 45.17
(6) X(14) − X(7) = 2.274

FIGS. 11A–11L, 12A–12L are graphs showing various aberrations of the zoom lens system according to Example 4 of the present invention. FIGS. 11A–11D show various aberrations focused on infinity in the wide-angle end state (minimum focal length state). FIGS. 11E–11H show various aberrations focused on infinity in an intermediate focal length state. FIGS. 11I–11L show various aberrations focused on infinity in the telephoto end state (maximum focal length state). FIGS. 12A–12D show various aberrations focused on R=0.33 m in the wide-angle end state. FIGS. 12E–12H show various aberrations focused on R=0.33 m in the intermediate focal length state. FIGS. 12I–12L show various aberrations focused on R=0.33 m in the telephoto end state. As apparent from the respective diagrams showing various aberrations, excellent compensation is made for the various aberrations at the respective image distances and at the respective focal lengths.

As mentioned above, the present invention can provide an inner-focusing type zoom lens system consisting of two lens groups, a negative lens group and a positive lens group, with the maximum angle of view of more than 100° and the zoom ratio of 1.7 or more.

The forgoing description of the embodiment of the invention has been presented for purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A zoom lens system comprising, in order from an object side:
   a first lens group having a negative refractive power; and
   a second lens group having a positive refractive power;
   wherein zooming operation is carried out by changing an interval between the first lens group and the second lens group;
   wherein the second lens group includes, in order from the object side;
      a front second lens group having a positive refractive power; and
      a rear second lens group having a positive refractive power;
   wherein focusing operation is carried out by moving the front second group to an image side; and
   wherein the following conditional expression is satisfied;

$$0.002 < \Sigma\{1/(ni \cdot fi)\} < 0.004$$

where
   $ni$ denotes refractive index for d-line ($\lambda$=587.56 nm) of the i-th lens element counted from the object side;
   $fi$ denotes the focal length for d-line ($\lambda$=587.56 nm) of the i-th lens element counted from the object side; and
   the summation is to be carried out from the first lens surface to the last lens surface.

2. The zoom lens system according to claim 1, wherein the following conditional expression is satisfied;

$$1.3 < f21/f22 < 1.5$$

where
   $f21$ denotes the focal length of the front second lens group; and
   $f22$ denotes the focal length of the rear second lens group.

3. The zoom lens system according to claim 2,
   wherein the rear second lens group includes at least a pair of cemented lens composed of a negative lens and a positive lens; and
   wherein the following conditional expressions are satisfied:

$$1.5 < |f1|/fw < 2$$
   $$0.335 < n1 - n2$$
   $$45 < v2 - v1$$

where
   $f1$ denotes the focal length of the first lens group,
   $fw$ denotes the focal length of the zoom lens system in the wide-angle end state,
   $n1$ denotes the refractive index for d-line of the negative lens in the cemented lens,
   $n2$ denotes the refractive index for d-line of the positive lens in the cemented lens,
   $v1$ denotes Abbe number of the negative lens in the cemented lens, and
   $v2$ denotes Abbe number of the positive lens in the cemented lens.

4. The zoom lens system according to claim 3,
   wherein the first lens group includes at least three negative lenses and at least one positive lens,
   wherein a surface of at least the three negative lenses is an aspherical surface satisfying the following conditional expression:

$$2 < X(14) - X(7) < 2.5$$

where $X(y)$ is denoted by the following aspherical expression:

$$X(y) = (y^2/r)/\left[1 + \{1 - \kappa(y/r)^2\}^{1/2}\right] + C_2 y^2 + C_4 y^4 + C_6 y^6 + C_8 y^8 + C_{10} y^{10}$$

where
   $X(14)$ denotes a displacement along an optical axis from an osculating plane at a vertex of the aspherical surface denoted by the above aspherical expression at a height $y=14$ mm,
   $X(7)$ denotes the displacement along the optical axis from the osculating plane at the vertex of the aspherical surface denoted by the above aspherical expression at the height $y=7$ mm,
   $r$ denotes a paraxial radius of curvature,
   $\kappa$ denotes the conical coefficient, and
   $C_n$ denotes the aspherical surface coefficient of n-th order.

5. The zoom lens system according to claim 2,
   wherein the first lens group includes at least three negative lenses and at least one positive lens,
   wherein a surface of at least the three negative lenses is an aspherical surface satisfying the following conditional expression:

$$2 < X(14) - X(7) < 2.5$$

where $X(y)$ is denoted by the following aspherical expression:

$$X(y) = (y^2/r)/\left[1 + \{1 - \kappa(y/r)^2\}^{1/2}\right] + C_2 y^2 + C_4 y^4 + C_6 y^6 + C_8 y^8 + C_{10} y^{10}$$

where
   $X(14)$ denotes a displacement along an optical axis from an osculating plane at a vertex of the aspherical surface denoted by the above aspherical expression at a height $y=14$ mm,
   $X(7)$ denotes the displacement along the optical axis from the osculating plane at the vertex of the aspherical surface denoted by the above aspherical expression at the height $y=7$ mm,
   $r$ denotes a paraxial radius of curvature,
   $\kappa$ denotes the conical coefficient, and
   $C_N$ denotes the aspherical surface coefficient of n-th order.

6. The zoom lens system according to claim 1,
   wherein the rear second lens group includes at least a pair of cemented lens composed of a negative lens and a positive lens; and
   wherein the following conditional expressions are satisfied:

$$1.5 < |f1|/fw < 2$$
   $$0.335 < n1 - n2$$
   $$45 < v2 - v1$$

where
   $f1$ denotes the focal length of the first lens group,
   $fw$ denotes the focal length of the zoom lens system in the wide-angle end state, n1 denotes the refractive index for d-line of the negative lens in the cemented lens, n2 denotes the refractive index for d-line of the positive lens in the cemented lens, ν1 denotes Abbe number of the negative lens in the cemented lens, and ν2 denotes Abbe number of the positive lens in the cemented lens.

7. The zoom lens system according to claim 6, wherein the first lens group includes at least three negative lenses and at least one positive lens, wherein a surface of at least the three negative lenses is an aspherical surface satisfying the following conditional expression:

$$2 < X(14) - X(7) < 2.5$$

where $X(y)$ is denoted by the following aspherical expression:

$$X(y) = (y^2/r)/\left[1 + \{1 - \kappa(y/r)^2\}^{1/2}\right] + C_2 y^2 + C_4 y^4 + C_6 y^6 + C_8 y^8 + C_{10} y^{10}$$

where $X(14)$ denotes a displacement along an optical axis from an osculating plane at a vertex of the aspherical surface denoted by the above aspherical expression at a height y=14 mm, $X(7)$ denotes the displacement along the optical axis from the osculating plane at the vertex of the aspherical surface denoted by the above aspherical expression at the height y=7 mm, r denotes a paraxial radius of curvature, κ denotes the conical coefficient, and $C_n$ denotes the aspherical surface coefficient of n-th order.

8. The zoom lens system according to claim 1, wherein the first lens group includes at least three negative lenses and at least one positive lens, wherein a surface of at least the three negative lenses is an aspherical surface satisfying the following conditional expression:

$$2 < X(14) - X(7) < 2.5$$

where $X(y)$ is denoted by the following aspherical expression:

$$X(y) = (y^2/r)/\left[1 + \{1 - \kappa(y/r)^2\}^{1/2}\right] + C_2 y^2 + C_4 y^4 + C_6 y^6 + C_8 y^8 + C_{10} y^{10}$$

where $X(14)$ denotes a displacement along an optical axis from an osculating plane at the vertex of the aspherical surafe denoted by the above aspherical expression at a height y=14 mm, $X(7)$ denotes the displacement along the optical axis from the osculating plane at the vertex of the aspherical surface denoted by the above aspherical expression at the height y=7 mm, r denotes a paraxial radius of curvature, κ denotes the conical coefficient, and $C_n$ denotes the aspherical surface coefficient of n-th order.

9. A zoom lens system comprising, in order from an object side:

a first lens group having a negative refractive power; and a second lens group having a positive refractive power;

wherein zooming operation is carried out by changing an interval between the first lens group and the second lens group;

wherein the second lens group includes, in order from the object side;

a front second lens group having a positive refractive power; and a rear second lens group having a positive refractive power;

wherein focusing operation is carried out by moving the front second group to an image side; and wherein the following conditional expression is satisfied;

$$1.3 < f21/f22 < 1.5$$

where f21 denotes the focal length of the front second lens group; and f22 denotes the focal length of the rear second lens group.

10. The zoom lens system according to claim 9, wherein the rear second lens group includes at least a pair of cemented lens composed of a negative lens and a positive lens; and wherein the following conditional expressions are satisfied:

$$1.5 < |f1|/fw < 2$$

$$0.335 < n1 - n2$$

$$45 < \nu2 - \nu1$$

where f1 denotes the focal length of the first lens group, fw denotes the focal length of the zoom lens system in the wide-angle end state, n1 denotes the refractive index for d-line of the negative lens in the cemented lens, n2 denotes the refractive index for d-line of the positive lens in the cemented lens, ν1 denotes Abbe number of the negative lens in the cemented lens, and ν2 denotes Abbe number of the positive lens in the cemented lens.

11. The zoom lens system according to claim 10, wherein the first lens group includes at least three negative lenses and at least one positive lens, wherein a surface of at least the three negative lenses is an aspherical surface satisfying the following conditional expression:

$$2 < X(14) - X(7) < 2.5$$

where $X(y)$ is denoted by the following aspherical expression:

$$X(y) = (y^2/r)/\left[1 + \{1 - \kappa(y/r)^2\}^{1/2}\right] + C_2 y^2 + C_4 y^4 + C_6 y^6 + C_8 y^8 + C_{10} y^{10}$$

where $X(14)$ denotes a displacement along an optical axis from an osculating plane at a vertex of the aspherical surface denoted by the above aspherical expression at a height y=14 mm, X(7) denotes the displacement along the optical axis from the osculating plane at the vertex of the aspherical surface denoted by the above aspherical expression at the height y=7 mm, r denotes a paraxial radius of curvature, κ denotes the conical coefficient, and $C_n$ denotes the aspherical surface coefficient of n-th order.

12. The zoom lens system according to claim 9, wherein the first lens group includes at least three negative lenses and at least one positive lens, wherein a surface of at least the three negative lenses is an aspherical surface satisfying the following conditional expression:

$$2<X(14)-X(7)<2.5$$

where X(y) is denoted by the following aspherical expression:

$$X(y) = (y^2/r)/\left[1 + \{1-\kappa(y/r)^2\}^{1/2}\right] + C_2 y^2 + C_4 y^4 + C_6 y^6 + C_8 y^8 + C_{10} y^{10}$$

where

X(14) denotes a displacement along an optical axis from an osculating plane at a vertex of the aspherical surface denoted by the above aspherical expression at a height y=14 mm, X(7) denotes the displacement along the optical axis from the osculating plane at the vertex of the aspherical surface denoted by the above aspherical expression at the height y=7 mm, r denotes a paraxial radius of curvature, κ denotes the conical coefficient, and $C_n$ denotes the aspherical surface coefficient of n-th order.

13. A zoom lens system comprising, in order from an object side:

a first lens group having a negative refractive power; and a second lens group having a positive refractive power;

wherein zooming operation is carried out by changing an interval between the first lens group and the second lens group;

wherein the zoom lens system has a maximum angle of view of 100° or more in a zooming range wherein the second lens group includes, in order from the object side, a front second lens group having a positive refractive power and a rear second lens group having a positive refractive power; and wherein focusing operation is carried out by moving the front second group to the image side.

14. The zoom lens system according to claim 13, wherein the zoom lens system has a zoom ratio of 1.7 or more.

15. The zoom lens system according to claim 13, wherein the following conditional expression is satisfied;

$$0.002<\Sigma\{1/(ni \cdot fi)\}<0.004$$

where ni denotes refractive index for d-line (λ=587.56 nm) of the i-th lens element counted from the object side;

fi denotes the focal length for d-line (λ=587.56 nm) of the i-th lens element counted from the object side; and the summation is to be carried out from the first lens surface to the last lens surface.

16. The zoom lens system according to claim 13, wherein the following conditional expression is satisfied;

$$1.3<f21/f22<1.5$$

where f21 denotes the focal length of the front second lens group; and f22 denotes the focal length of the rear second lens group.

17. The zoom lens system according to claim 13, wherein the first lens group satisfies the following conditional expression:

$$1.5<|f1|/fw<2$$

where f1 denotes the focal length of the first lens groups and fw denotes the focal length of the zoom lens system in the wide-angle end state.

18. The zoom lens system according to claim 13, wherein the rear second lens group includes at least a pair of cemented lens composed of a negative lens and a positive lens; and wherein the following conditional expressions are satisfied:

$$0.335 < n1 - n2$$
$$45 < v2 - v1$$

where n1 denotes the refractive index for d-line of the negative lens in the cemented lens, n2 denotes the refractive index for d-line of the positive lens in the cemented lens, v1 denotes Abbe number of the negative lens in the cemented lens, and v2 denotes Abbe number of the positive lens in the cemented lens.

* * * * *